Aug. 2, 1966    K. BREER    3,263,966
MIXING APPARATUS
Filed Nov. 3, 1964
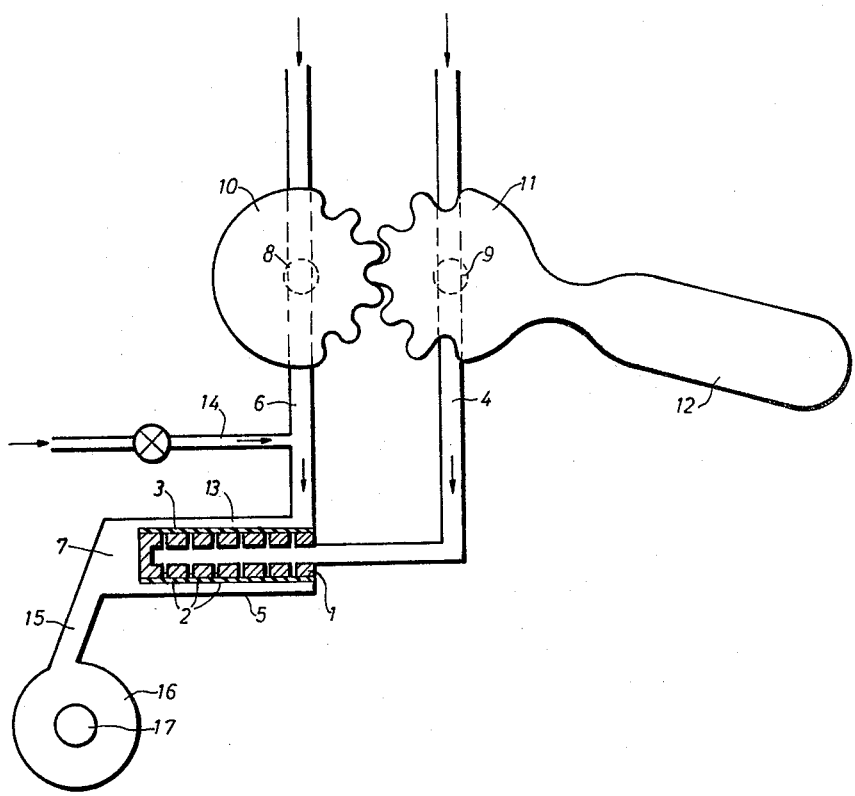
INVENTOR.
KARL BREER
BY
ATTORNEYS

United States Patent Office 3,263,966
Patented August 2, 1966

3,263,966
MIXING APPARATUS
Karl Breer, Cologne-Flittard, Germany, assignor to Farbenfabriken Bayer Aktiengesellschaft, Leverkusen, Germany, a corporation of Germany
Filed Nov. 3, 1964, Ser. No. 408,586
Claims priority, application Germany, Nov. 5, 1963, F 41,188
1 Claim. (Cl. 259—4)

This invention relates to a mixing apparatus and more particularly, to a mixing apparatus for the preparation of synthetic resins prepared by reacting together two or more highly reactive components.

It has been heretofore known that when such reactions are conducted by introducing components under pressure into a mixing chamber through inlets, serious problems are encountered when the supply of the reaction components is interrupted. The material remaining in the mixing apparatus will immediately begin to react thus causing the formation of the synthetic resins within the chamber resulting in blockage. This requires that the apparatus be shut down and cleaned before further use of it can be made.

It is an object of this invention to provide an apparatus that overcomes these disadvantages. It is another object of this invention to provide a simplified apparatus for mixing highly reactive components that form a solidified product. It is still another object of this invention to provide an apparatus for the preparation of polyurethane plastics, the operation of which can be repeatedly interrupted without causing blockage of the mixing chamber.

The foregoing objects and others which will become apparent from the following description are accomplished in conjunction with the accompanying drawing which illustrates one embodiment of the invention by providing a mixing chamber having an inlet means for introducing a plurality of reactive components and a discharge means. The inlet means includes two concentrically arranged tubular conduits. For simplification, the inner tubular member will be referred to as the first conduit and the outer member as the second conduit. The second conduit is simply a tubular conduit large enough to include the concentrically arranged first conduit and still provide an annular space between the external surface of the first conduit and the internal surface of the second conduit. The first conduit terminates within the second conduit and has a sealed end. A plurality of apertures extend transversely through the wall of the first conduit. An elastic sleeve is disposed to surround the outer surface of the first conduit and cover the transversely extending apertures. The first and second conduits are connected in fluid-flow relationship with the source of the different reaction components used in the reaction. A means is provided to simultaneously introduce the reaction components into the first and second conduits respectively. A means is provided to maintain the second conduit under super atmospheric pressure. Thus, in operation as the reactive components are permitted to flow into the first and second conduits, the material in the first conduit being under pressure, will flow through the tubular conduit through the transverse apertures and will force the elastic sleeve away from the aperture thus permitting the material in the first conduit to contact the material in the second conduit and flow through the chamber and out the discharge outlet. When the flow of material in the first conduit is altered, the elastic sleeve will again cover the apertures and prevent any material therein from reaching the material in the second conduit. Any residues of mixture remaining in the mixing chamber are then removed by rinsing. This rinsing can be accomplished by permitting the reactive components flowing through the second conduit to continue for a period of time after halting the flow through the first conduit or it can be accomplished by the introduction of a different material such as a solvent through the second conduit. A pressure-sensing device can be incorporated into the system to operate overflow valves when the sleeve is in the closed position to return the material flowing through the second conduit to the storage container.

The apparatus will be more specifically described in conjunction with the accompanying drawing which illustrates the invention. The apparatus as shown in the drawing is used in the preparation of a cellular polyurethane plastic wherein a polyol-activator mixture is mixed with an organic polyisocyanate to prepare the foam. The polyol-activator mixture enters the conduit on the left from a suitable storage means and passes through valve 8, when in the open position, through conduit 6 and into the annular chamber 13, formed by the inner surface of conduit 5 and the rubber sleeve 3. The annular chamber 13 is in fluid-flow relationship with the mixing chamber 7. The organic polyisocyanate enters the conduit on the right from a suitable storage device, passes through valve 9 and conduit 4 which has a sealed end. As shown, conduit 4 is in concentric relationship with the second conduit 5. The conduit 4 has disposed around it a nozzle element 1 which is a tubular member that fits tightly on the conduit 4. Both the conduit 4 and the nozzle element 1 have a plurality of apertures 2 which extend transversely therethrough. An elastic sleeve 3 of a material such as rubber surrounds the tubular nozzle element 1 and prevents material within the conduit 4 and apertures 2 from engaging the material in the annular space 13. After the mixed reactants pass through mixing chamber 7, they will discharge through outlet conduit 15 which opens substantially tangentially into an after mixing eddy chamber 16 from which the finished mixture leaves through discharge outlet 17.

The valves 8 and 9 are arranged so they can be simultaneously actuated. This is accomplished by operating the valves through intermeshing toothed gears 10 and 11. As shown, the gear 11 is provided with a handle lever 12 for manually positioning the valves 8 and 9 in either the open or closed position. A means is provided in conduit 6 for maintaining the conduit 6 and second conduit 5 under pressure. This means includes a supply of air under pressure which can be introduced to conduit 6 through a valve positioned in conduit 14. Thus, the component in conduit 6 is mixed with air before flowing into the annular space 13.

The mixing apparatus is important for all synthetic resins whose reaction components tend to block up the mixing apparatus under the delivery pressure. This is also the case, for example, when a component consisting of a polyol activator is mixed with a second component consisting of isocyanate.

This mixing apparatus has been found useful for example, for the manufacture of foam plastics from synthetic resins which contain urethane groups; in this process, the polyol activator component mixed with air under pressure is supplied through the conduit 6 and the isocyanate as other component is supplied to the mixing chamber 7 through the conduit 4, apertures 2 of nozzle element 1 and the space between sleeve 3 and nozzle element 1. When the pump is turned off, the closure member 9 for the isocyanate is first closed and the mixing chamber 7 is washed with the polyol activator component while the closure member 8 is still open.

Although the invention has been described in considerable detail in the foregoing for the purpose of illustration, it is to be understood that such detail is solely for this purpose and that variations can be made by those skilled in the art without departing from the spirit and scope of the invention except as is set forth in the claim.

What is claimed is:

A mixing apparatus for intimately combining reactive components which comprises a mixing chamber, said chamber having an inlet means for a plurality of components and a discharge means, said inlet means including a first tubular conduit and a second tubular conduit in fluid-flow relationship with said chamber, said first conduit being concentric with said second conduit and disposed within said second conduit, said first conduit having a sealed end, a plurality of apertures through the tubular wall thereof, a tightly fitting elastic sleeve surrounding said tubular conduit and covering said apertures, a means provided in said inlet means for simultaneously causing fluid-flow to said first and second tubular conduits, an after-mixing chamber wherein circular motion is imparted to the mixed reactive components and an outlet from said aftermixing chamber.

References Cited by the Examiner

UNITED STATES PATENTS

| 2,533,191 | 12/1950 | Jaeger | 259—168 |
| 2,697,637 | 12/1954 | Mittelstadt | 258—168 |

FOREIGN PATENTS

| 1,339,261 | 8/1963 | France. |
| 109,986 | 3/1944 | Sweden. |

WALTER A. SCHEEL, *Primary Examiner.*

ROBERT W. JENKINS, *Assistant Examiner.*